UNITED STATES PATENT OFFICE.

ALLERTON S. CUSHMAN, OF WASHINGTON, DISTRICT OF COLUMBIA.

PROCESS FOR REMOVING INK AND OTHER STAINS FROM CLOTH, PAPER, &c.

1,361,833.  Specification of Letters Patent.  Patented Dec. 14, 1920.

No Drawing.   Application filed August 27, 1920. Serial No. 406,498.

*To all whom it may concern:*

Be it known that I, ALLERTON SEWARD CUSHMAN, a citizen of the United States, and residing in the District of Columbia, have invented certain new and useful Improvements in or Relating to Processes for Removing Ink and other Stains from Cloth, Paper, &c., of which the following is a specification.

This invention has for its object the removal of ink stains, grass stains, fruit stains, and other stains or discolorations from clothing, paper, etc., so that the article will be restored to its original condition and value. The process which is the subject of the present invention consists essentially in first treating the stain with an oxidizing agent, as for instance a two per cent. solution of potassium permanganate; second, treating the stain with a reducing agent, such as an eight per cent. solution of oxalic acid; and third, washing out all chemicals with water. The addition of ten per cent. by volume of commercial hydrogen peroxid solution to the eight per cent. oxalic solution improves its action, but this addition is not essential to the working of the invention.

In carrying out the process which is the subject of this invention, the article of clothing upon which there is an ink, grass or other organic stain is first thoroughly wetted with the oxidizing solution and allowed to stand at room temperature for a varying length of time, usually about ten minutes. At the end of this time the excess oxidizing solution is drained off, and the reducing solution added. This is allowed to stand until all color has disappeared. This usually takes from five to fifteen minutes. The chemicals are then thoroughly washed with water, whereupon the cloth will be found to be restored to its original condition without injury to the fabric in any way.

Having described my invention and the manner in which it is to be performed, what I claim is:

1. A process for removing ink, grass and other stains by the action of a dilute potassium permanganate solution, followed by the application of an oxalic acid solution, with the addition of hydrogen peroxid, afterward washing with water, substantially as described.

2. As an article of manufacture, an ink and stain eradicator, consisting of (1) a dilute solution of potassium permanganate and (2) a strong solution of oxalic acid, with the addition of hydrogen peroxid, substantially as described.

In testimony whereof I have signed my name to this specification in the presence of two subscribing witnesses.

ALLERTON S. CUSHMAN.

Witnesses:
 P. H. BUTLER,
 PAUL BREDEKAMP.